United States Patent [19]

Maruyama et al.

[11] 4,316,225

[45] Feb. 16, 1982

[54] ROTARY HEAD ASSEMBLY FOR MAGNETIC RECORDING AND REPRODUCING DEVICE

[75] Inventors: Teruo Maruyama, Neyagawa; Minoru Koda, Hirakata; Masato Morimoto, Kadoma; Toshitsugu Inoue, Kyoto, all of Japan

[73] Assignee: Matsushita Electric Industrial Co., Ltd., Osaka, Japan

[21] Appl. No.: 154,288

[22] Filed: May 29, 1980

[30] Foreign Application Priority Data

Jun. 5, 1979 [JP] Japan ................................. 54-70919

[51] Int. Cl.³ .................... G11B 5/52; G11B 15/60; G11B 21/04
[52] U.S. Cl. ..................................... 360/107; 360/84; 360/130.22
[58] Field of Search ............... 360/107, 102, 104, 108, 360/130.21, 130.22, 130.23, 130.24, 84, 85

[56] References Cited

U.S. PATENT DOCUMENTS

| 3,981,024 | 9/1976 | Mo ....................................... 360/102 |
| 4,099,210 | 7/1978 | Dolby ............................. 360/130.22 |
| 4,163,288 | 7/1979 | Tamamura ..................... 360/130.21 |
| 4,251,840 | 2/1981 | Maruyama .......................... 360/107 |

FOREIGN PATENT DOCUMENTS 482803 12/1976 U.S.S.R. .............................. 360/107

*Primary Examiner*—Robert M. Kilgore
*Attorney, Agent, or Firm*—Burgess, Ryan and Wayne

[57] ABSTRACT

In a rotary head assembly for a magnetic recording and reproducing device of the type in which rotary head member is engaged through a hydraulic bearing with a shaft whose one end is securely fixed to a base and the other end is free, the position of a thrust supporting member formed at the free end of the shaft is suitably selected so as to minimize the adverse effects caused by the thermal expansions of the component parts whereby the variation in relative position between the head and tape due to the temperature variation can be minimized and the high radial rigidity can be attained.

1 Claim, 4 Drawing Figures

ROTARY HEAD ASSEMBLY FOR MAGNETIC RECORDING AND REPRODUCING DEVICE

BACKGROUND OF THE INVENTION

The present invention relates generally to a magnetic recording and reproducing device and more particularly, to the construction of a bearing which supports, by a hydraulic bearing a high precision rotation transmission device such as a cylinder in a video tape recorder (VTR).

The rotary head assembly of VTR must maintain the relative velocity and position between a head and a tape with higher degrees of accuracy and must reproduce them with a higher degree of fidelity. However, in order to satisfy the demand for recording with a higher degree of density so as to increase the recording and reproducing time interval, the prior art rotary head assembly of the type which uses the rolling contact bearings has been found unsatisfactory. Therefore, in order to attain the accurate rotation, there have been proposed various types of rotary head assemblies using the hydraulic bearings. In case of the commercial VTR, however, there arises a difficult problem how to seal a predetermined quantity of lubricating oil with a low viscosity in a cylinder without leakage. Furthermore, in order to carry out the required performance, the rotary head assembly with the hydraulic bearings becomes very complex in construction. The commercial VTR sets must be mass produced with low costs. Otherwise, they have no commercial value at all. In order to solve the above and other problems, there have been devised and demonstrated various rotary head assemblies with the hydraulic bearings. For instance, a copending U.S. Patent application Ser. No. 4,564 now U.S. Pat. No. 4,251,840, '79 discloses a rotary head assembly with hydraulic bearings. The upper and lower cylinders of the VTR rotary head assembly along which travels the tape in contact therewith are made of aluminum with is non-magnetic and highly resistive to corrosion and has a lower coefficient of thermal expansion. The shaft is made of steel with a higher modulus of longitudinal elasticity so that the rigidity of the rotating member can be attained. The upper and lower cylinders and the shaft are different in coefficient of thermal expansion so that even when the relative position between the tape and the head is correctly determined at room temperature, it varies with temperature variation. Since there has been a strong tendency toward the decrease in track width on the tape so that a high density recording can be attained, the tracking error between the head and the tape must be minimized as much as possible.

SUMMARY OF THE INVENTION

In view of the above, the primary object of the present invention is to provide a rotary head assembly for a magnetic recording and reproducing device which can minimize the tracking error caused by the temperature variation, can attain high radial stiffness and can be made very compact in size and light in weight.

According to one aspect of the present invention, a rotary head assembly is provided which has a sleeve rotatably fitted through a hydraulic bearing over a center shaft whose one end is securely fixed to a base plate. The free end of the center shaft which rotatably supports a rotary cylinder is positioned radially inwardly of and adjacent to the inner wall of a head which is mounted on the rotary cylinder. As a result, the variation in relative position between the head and the tape due to the difference in coefficient of thermal expansion between the component parts can be minimized to a negligible degree.

DESCRIPTION OF THE PREFERRED EMBODIMENT

Figure 1:
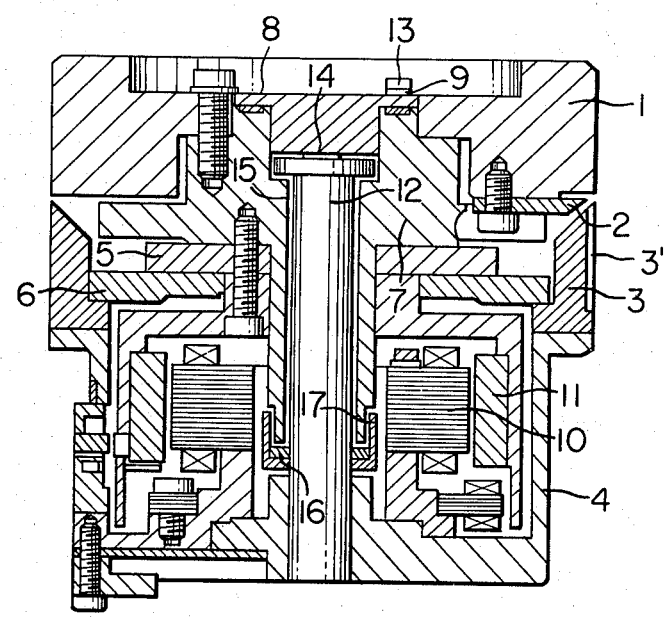
FIG. 1 shows a longitudinal sectional view of a VTR rotary head assembly in accordance with the present invention.

Referring to FIG. 1, numeral 1 is an upper cylinder or a rotary head; 2, a head mounted on the upper cylinder 1 and 3, a lower cylinder which is mounted on a lower housing 4 and guides a tape. Numeral 3' shows a guide groove in the lower cylinder 3 for guiding the tape. Numeral 5 shows a rotary transformer and numeral 6 shows a stationary transformer. Numerals 5 and 6 constitute a rotary transformer which can transmit the signal from a rotating member to a stationary member without any contact therebetween. Numeral 7 shows a rotary sleeve upon which is mounted the upper cylinder 1 in such a way that the upper cylinder 1 can be removed upwardly from the rotary sleeve 7. Numeral 8 shows an upper cap with a flange which is securely attached to the upper surface of the rotary sleeve 7 with bolts 13 through an oil seal 9 which can prevent the leakage of a lubricant. Numerals 10 and 11 are a stator and a rotor, respectively, of a direct-drive motor for imparting the rotary motion to the rotating member of the device in accordance with the present invention. Numerals 1, 7 and 11 constitute the rotating member. Numeral 12 shows a center shaft made of a tool steel alloy and shrinkage-fitted to the lower housing 4. The center shaft 12 is provided with grooves of a spiral groove (not shown) which is one of the non-circle bearings. Therefore, there is provided a bearing construction which can prevent the generation of oil whirls which is the unstable phenomenon inherent to the hydraulic bearings. Numeral 14 shows a thrust bearing member formed at the free and open end portion of the center shaft 12. A magnetic fluid 15 which is a lubricating liquid is contained between the center shaft 12 and the rotary sleeve 7, and a magnetic seal is provided at the lower open end portion of the rotary sleeve 7 in order to prevent the leakage of the magnetic liquid 15. Numeral 16 shows a permanent magnet for the magnetic seal, and numeral 17 shows a casing for housing the permanent magnet 16, the casing being securely mounted on the center shaft 12.

As described above, the cylinder construction with the hydraulic bearing in accordance with the present invention is such that the rotary sleeve 7 which is rotatably engaged through the film of lubricating oil with the center shaft 12 mounted at its one end on the lower housing 4 which serves as a base plate is rotated by the direct-drive motor. As a result, the rotation with a higher degree of accuracy can be ensured by the hydraulic lubrication. Furthermore, the hydraulic bearing is provided inwardly of the upper and lower cylinders 1 and 3 and the rotor 11 and stator 10 of the direct motor so that there can be provided the rigidity of the oil film sufficient to carry the radial load. In addition, the device of the present invention has no dead space resulting from the use of the ball bearings or the like as in the prior art devices, so that the device of the present invention can be made compact in size. Moreover, the present invention is characterized in that the thrust bearing member 14 which is provided in order to restrict the axial height of the rotary member is located inwardly of the inner wall of the head 2 mounted on the upper cylinder 1, so that the deviation in the relative position between the head 2 and the tape due to the difference in thermal expansion of members can be minimized.

Figure 2:
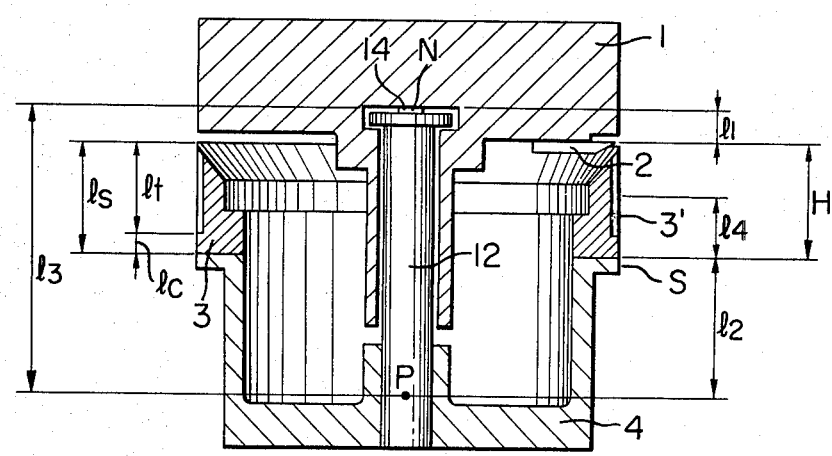
FIG. 2 shows dimensions thereof.

Referring to FIG. 2 which is a longitudinal sectional view, S is a mounting position of the device which is used as a reference surface. That is, the cylinder is mounted on a reference chassis's surface of a VTR device. N indicates the position of the free end of the center shaft 12, and P indicates the average position at which the center shaft 12 is supported.

In the Table 1 below, the dimensions H and $l_1$ through $l_4$ are listed.

TABLE 1

| Symbol | Description | Size in mm |
|---|---|---|
| H | the distance between the reference surface S and the head 2 | 17.0 |
| $l_1$ | the distance between the head 2 and the upper end N | 5.0 |
| $l_2$ | the distance between the support P and the reference surface S | 20.0 |
| $l_3$ | the axial length between P and N of the center shaft 12 | 42.0 |
| $l_4$ | the width of the guide groove 3 of the lower cylinder 3 which affects the thermal expansion | 11.4 |

The lower cylinder 3 is provided with the lead or guide groove 3 which guides the tape (not shown) and lifts the same upward due to the thermal expansion of the lower cylinder 3. The free end N of the center shaft 12 extends upward due to the thermal expansion while the supporting point P moves downward due to the thermal expansion of the lower housing 4. As a result, the axial height of the free end N is obtained by cancelling the thermal expansion of the center shaft 12 by that of the lower housing 4. Therefore, the increase in the distance H between the reference surface S and the head 2 due to the thermal expansion ΔH is given by $$\Delta H = \Delta l_3 - \Delta l_2 - \Delta l_4 - \Delta l_1 \qquad (1)$$

where $\Delta l_1$ through $\Delta l_4$ are increases in $l_1$ through $l_4$ due to the thermal expansion. The width of the lead or guide groove 3' of the lower cylinder 3 which affects the thermal expansion can be considered as follows.

The width of the lead or guide groove 3' of the lower cylinder along which travels the tape must be equal to at least the width of the tape. Furthermore, the lower cylinder 3 must have an additional width $l_c$ of at least 4 to 5 mm so that the lower cylinder 3 can be securely held in position with a chuck or the like in the case of machining. As a result, the width $l_s$ of the lower cylinder 3 becomes $$l_s = l_t + l_c$$

where $l_t$ is the width of the tape. It should be assumed that the tape can be lifted at the average position ($l_t/2$) from the upper end surface of the cylinder 3 in the lead or guide groove 3'. Then, the width of the lead or guide groove 3' which affects the thermal expansion is given by $$l_4 = l_t/2 + l_c.$$

For instance, with the tape of a width of ½ inch (12.7 mm) and the clamping width $l_c$ of 5 mm, $l_4$ is equal to 11.4 mm.

Table 2 below shows the materials and coefficients of thermal expansion of the component parts.

TABLE 2

| parts | materials | coefficients of thermal expansion |
|---|---|---|
| upper cylinder 1 | high strength aluminum | $23 \times 10^{-6}$ |
| lower cylinder 3 | high strength aluminum | $23 \times 10^{-6}$ |
| lower housing 4 | machinery carbon steel | $11 \times 10^{-6}$ |
| center shaft 12 | tool steel alloy | $11 \times 10^{-6}$ |

Since the tape travels along the upper and lower cylinders 1 and 3, they are in general made of aluminum which is nonmagnetic and exhibits high resistance to corrosion.

According to the present invention, the center shaft 12 is supported like a cantilever with one end securely fixed and the other end free. Therefore, in order to strengthen radial stiffness, it is made of steel.

The lower housing 4 serves to lower the supporting point P of the center shaft 12 relative to the reference surface S when thermally expanded. Therefore, in order to minimize the downward shift, it is made of steel.

The thermal expansion beyond the reference surface S of the member 12 which is made of steel is less than that of the members 1 and 3 which are made of aluminum. As a result, the relative deviation between the head 2 and the tape given by Eq. (1) becomes negative in the case of the construction shown in FIG. 1. That is, with the increase of environmental temperature, the distance between the head 2 and the tape becomes closer.

In the case of VTR cylinders, the deviation of or variation in relative position between the head 2 and the tape must be at a minimum.

In the case of the commercial VTR, the tapes with a track pitch of 60 or 30 μm is used. If in the case of reproduction there is a tracking error between the head 2 and the tape, a decrease in head output results. In general, the tolerable decrease in head output is −3 dB (30% in terms of tracking error).

When the decrease in output head exceeds a tolerable limit, the signal-to-noise ratio S/N is considerably decreased with the resultant adverse effects on the reproduced image such as jitter on the TV screen or drop out TV signal. Therefore, when the tape with the pitch of, for instance, 30 μm, the tolerable tracking error μ is $$\delta = 30 \ \mu m \times 0.3 = 9 \ \mu m$$

The commercial VTR is used at the temperatures between 5° and 40° C., so that the tolerable tracking error per unit temperature variation becomes, for instance, $$\delta < \frac{9 \ \mu m}{35° C.} = 0.257 \ \mu m/°C.$$

Figure 3:
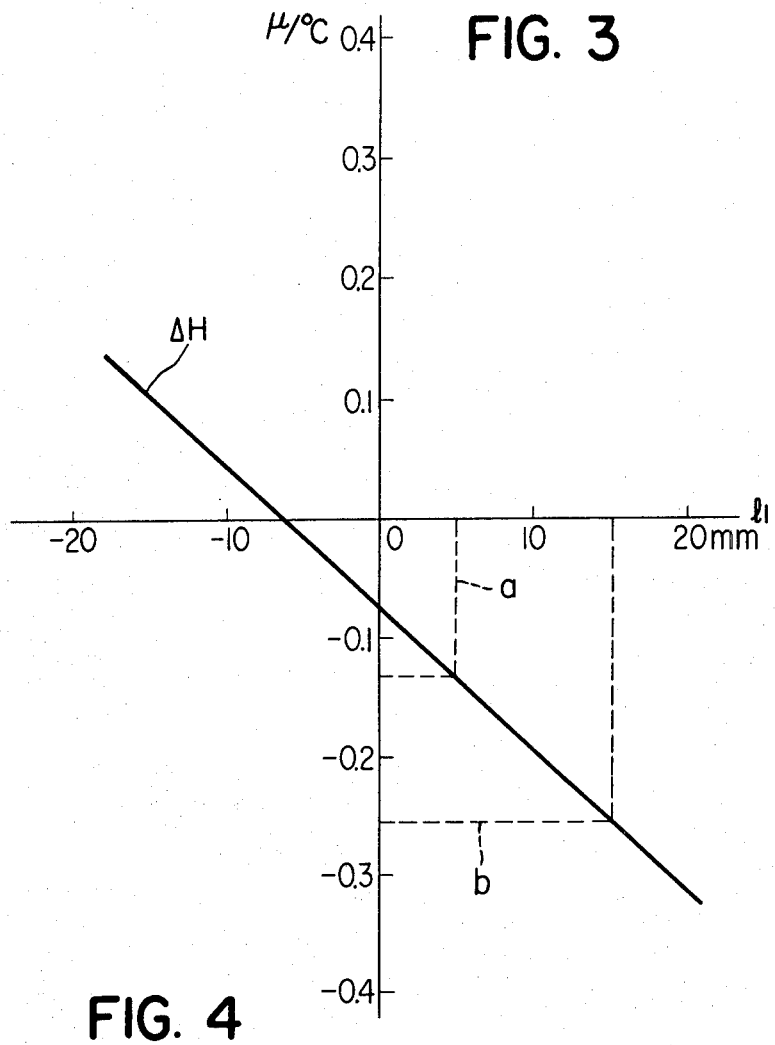
FIG. 3 is a graph showing the variation ($\Delta H$) in relative position between the head and the tape due to the temperature variation of the rotary head assembly shown in FIGS. 1 and 2.

FIG. 3 shows the deviation ($\Delta H$) in the relative position between the head 2 and the tape when the distance $l_1$ between the head 2 and the thrust bearing member 14 is varied. A tape of ½ inch width is used. The tolerable limit is indicated by the dotted lines (b) while the deviation of the rotary head assembly in accordance with the present invention is within the range indicated by the broken lines (a). For instance, when $l_1$ is equal to 0 that is, when the height of the head 2 is equal to that of the thrust bearing member 14, $\Delta H$ is equal to about $-0.15$ $\mu m/°C.$ which is equal to the lift of the tape due to the thermal expansion of the lead or guide groove 3' in the lower cylinder 3 plus the lift due to the thermal expansion of the center shaft 12. Therefore, it follows that in order to eliminate adverse effects due to the thermal expansion, the thrust bearing member 14 must be lower than the head 2. In FIG. 3, $\Delta H$ becomes zero when $l_1$ is equal to $-6.26$ mm. However, in order to attain sufficiently high rigidity of the hydraulic bearing, it is preferable that the thrust bearing member 14 is higher than the head 2. Thus, there arises the contradiction between the measure taken for eliminating the adverse effects due to the thermal expansion and the measure taken for attaining high rigidity of the hydraulic bearing.

Figure 4:
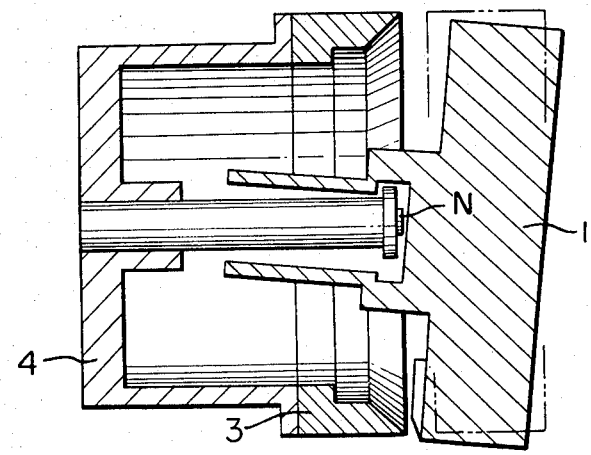
FIG. 4 shows the rotary head assembly in horizontal position with the resulting offset between the upper cylinder and the shaft.

In the case of a portable VTR, position errors must be minimum. Especially in the case of the horizontal position as shown in FIG. 4, the weight of the rotary member becomes the radial load so that when the rigidity of the oil film of the hydraulic bearing is weak, the axis of rotation of the rotary member is offset from the axis of the center shaft 12.

This offset results in the offset between the upper and lower cylinders 1 and 3 with the resultant variations in the absolute heights of the two heads 2 and the peripheral speed due to the variation in the radius of rotation. Therefore, the offset between the rotary member and the center shaft 12 must be as low as possible.

The present invention can solve this problem by raising the position of the thrust bearing member 14 as high as possible within a limit in which adverse effects due to the thermal expansion can be tolerable.

According to the present invention with $l_1$ equal to 5 mm, $|\Delta H|$ equals 0.135 $\mu m/°C.$ and is less than the tolerable limit 0.257 $\mu m/°C.$ Furthermore, between the center shaft 12 and the rotary sleeve 7, there is provided a radial bearing which is positioned as high as possible and has a sufficient effective length. As a result, there is provided a VTR cylinder which has a high radial stiffness and consequently, less position errors.

The above example is a comparatively extreme one. In practice, $l_1$ may be less than 16 mm as shown in FIG. 3.

The recent tendency in VTR is toward a decrease in track pitch. When the track pitch is Tp, a tolerable tracking error is in general $8.57 \times 10^{-3} \times Tp \ \mu m/°C.$ In summary, according to the present invention, the variation in relative position between the tape and head due to the thermal expansions of the component parts can be minimized, and a sufficiently high radial rigidity can be attained.

What is claimed is:

1. A rotary head assembly for a magnetic recording and reproducing device of the type having a stationary center shaft whose one end is securely fixed, comprising:
 a stationary cylinder having a cylindrical surface coaxial with said center shaft,
 a rotary cylinder which has a coefficient of thermal expansion different from that of said center shaft, being positioned adjacent to the end face of said stationary cylinder, having a cylindrical surface which is coaxial with said cylindrical surface of said stationary cylinder and having the same diameter as said cylindrical surface of said stationary cylinder, and rotating about the axis of said center shaft,
 a means for driving said rotary cylinder, and a head mounted on said rotary cylinder adjacent to a tape which is transported relative to said cylindrical surfaces of said stationary and rotary cylinders in contact with them,
 said stationary center shaft being securely fixed to said stationary cylinder,
 said rotary cylinder being provided with a bearing hole which receives said center shaft so that said rotary cylinder is rotatably supported by said center shaft,
 a lubricating liquid contained between said bearing hole and said center shaft, thereby providing a hydraulic bearing,
 the portion of said hydraulic bearing in the vicinity of its thrust load carrying point being sealed,
characterized in that
 the end face of said stationary cylinder opposite to the end face thereof in opposed relationship with said rotary cylinder is selected as a reference position or surface (S); and dimensions and materials of component parts of said rotary head assembly are so selected that the following condition can be satisfied:

$$\Delta H < \epsilon$$

where $\Delta H$ is the thermal expansion between said head and said thrust load carrying point and is expressed by $$\Delta H = \Delta l_3 - \Delta l_2 - \Delta l_4 - \Delta l_1 \ \mu m/°C.$$

where
 H is the distance between said head and said reference point or surface,
 $l_1$ is the distance between said head and said thrust load carrying point,
 $l_2$ is the distance between a fixed point on said center shaft and said reference point or surface,
 $l_3$ is the axial length of said center shaft between said fixed point and said thrust load carrying point, and
 $l_4$ is a width of said stationary cylinder which contributes to said thermal expansion $\Delta H$, and
 $\epsilon$ is equal to $8.57 \times 10^{-3} \times Tp \ \mu m/°C.$
where Tp is the track pitch of the tape.

* * * * *